C. O. WHITNELL.
STOCK WATERING TANK.
APPLICATION FILED JUNE 21, 1920.
1,400,194.
Patented Dec. 13, 1921.
Fig. 2.
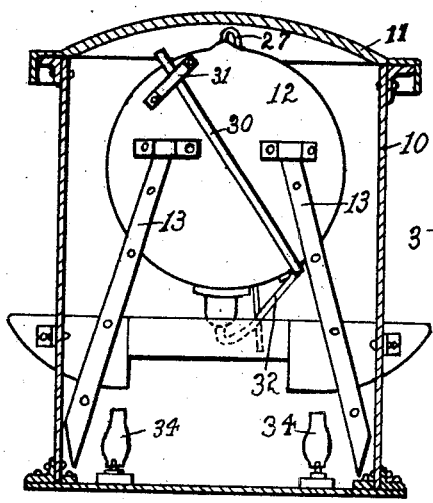
Fig. 1.
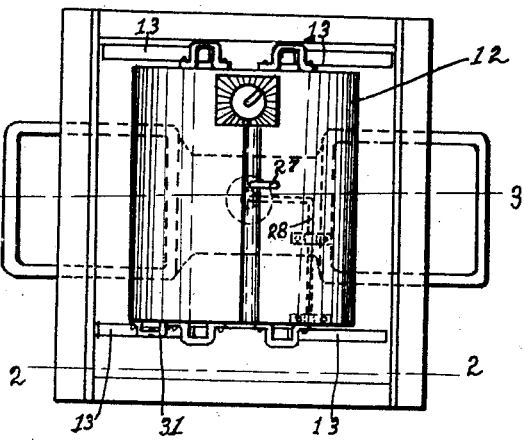
Fig. 4. Fig. 3. Fig. 5.
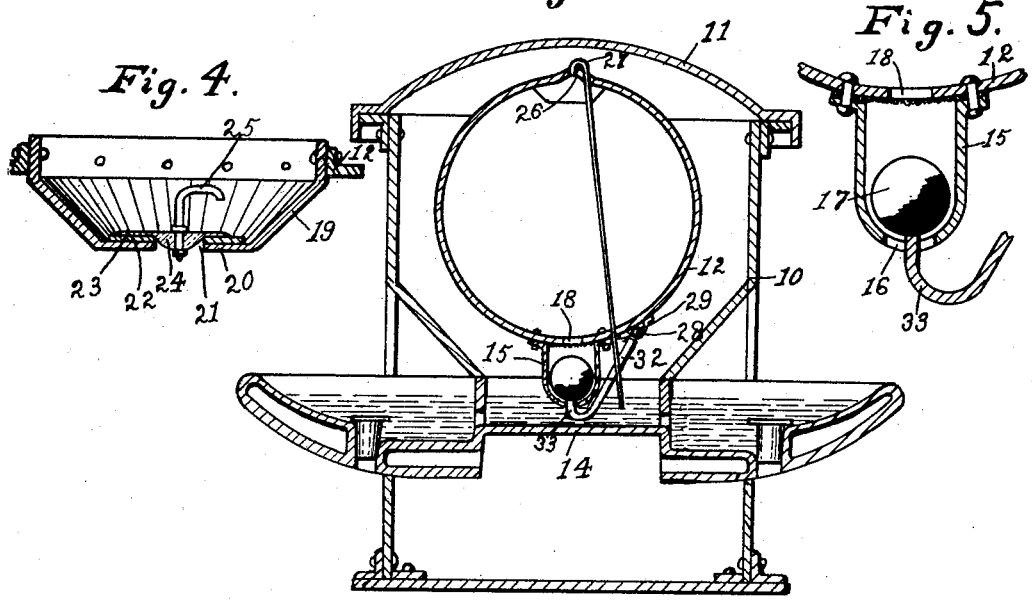
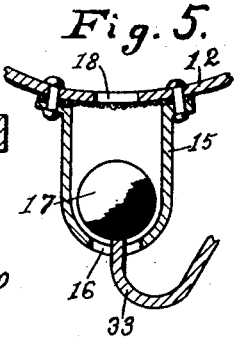
Witness.
Roy Kisor.
Inventor.
C. O. Whitnell.
By Orwig + Bair, Attorneys.

UNITED STATES PATENT OFFICE.

CHARLES O. WHITNELL, OF DES MOINES, IOWA.

STOCK-WATERING TANK.

1,400,194.  Specification of Letters Patent.  Patented Dec. 13, 1921.

Application filed June 21, 1920. Serial No. 390,875.

*To all whom it may concern:*

Be it known that I, CHARLES O. WHITNELL, a citizen of the United States, and a resident of Des Moines, in the county of Polk and State of Iowa, have invented a certain new and useful Stock-Watering Tank, of which the following is a specification.

The object of my invention is to provide a stock watering tank of simple and durable construction.

More particularly it is my object to provide such a tank of the type having an outside casing with a tubular or cylindrical tank mounted in the casing, above the lower portion thereof, and above a trough also received in the casing, and to which animals outside the casing may have access.

A further object is to provide in such a device suitable means for properly filling the tank when it has been emptied, in the course of ordinary use.

A further object is to provide such a device so constructed that when the tank is filled, all of the air therein may be driven out by the water.

With these and other objects in view my invention consists in the construction, arrangement and combination of the various parts of the device, whereby the objects contemplated are attained, as hereinafter more fully set forth, pointed out in my claim and illustrated in the accompanying drawings, in which :—

Figure 1 is a top or plan view of a stock watering tank embodying my invention.

Fig. 2 is a vertical, sectional view taken on the line 2—2 of Fig. 1.

Fig. 3 is a vertical, sectional view taken on the line 3—3 of Fig. 1.

Fig. 4 is a vertical, sectional view through the filling funnel; and

Fig. 5 is a vertical, sectional view through the discharge device and the valve structure for controlling the flow of water from a tank.

In the accompanying drawings, I have used the reference numeral 10 to indicate generally an outer metal casing having the removable cover 11. Within the casing, above the bottom thereof, there is mounted a cylindrical tank 12, on suitable supporting members 13. The tank 12 is fixed in position. Below the tank 12 is a trough 14, the ends of which project through the side walls of the casing 10, so as to permit access to the trough by animals for drinking.

At the lower part of the tank 12 is a downwardly extending discharge passage 15, having in its lower end an opening 16, above which is a ball valve 17. An opening 18 affords communication between the bottom of the tank 12 and the discharge passage 15. The passage 15 projects downwardly into the trough 14 so that when water flows out into the trough from the tank it will rise as high as the opening 16 and the flow of water from the tank will then cease until the water in the trough is lowered.

For filling the tank I have provided the following means: Set in the upper portion of the tank, preferably near one end thereof, is a filling pan or funnel device 19, having a bottom member 20 inside the tank formed with the opening 21. Above the bottom member 20, and surrounding the opening 21, is a washer or the like 22. For closing the opening 21 I provide an ordinary stopper comprising the rubber disk 23, designed to rest above the washer 22. This rubber disk is provided with the thickened central portion 24 adapted to project into the hole 21. Mounted in the thickened portion 24 is one end of a suitable handle 25, which may be grasped for manipulating the stopper device.

The tank 12 is made with an inwardly opening channel 26 formed in its upper wall, extending preferably from the filling funnel 19 to the opposite end of the tank. This channel 26 extends upwardly above the main body of the tank, as illustrated for instance in Figs. 2 and 3.

This channel 26 forms the passage in which air may collect during the process of filling the tank with water.

Connected with the upper part of the channel 26 preferably near the middle of the tank 12, is an air discharge pipe 27 which extends first upwardly from the channel 26, and then is extended downwardly through the tank walls, at the top and bottom of the tank, and downwardly preferably along side the discharge passage 15 to position below the discharge opening therein. For controlling the ball valve 17, I have provided on the lower part of the tank 12 a shaft 28 shown in Fig. 3, and in dotted lines in Fig. 1, rotatably mounted in suitable bearings 29 on the outer surface of the tank. At one end of the shaft 28 there is connected therewith an upwardly extending handle 30, projecting along the ends of the tank 12, as shown in Fig. 2. The upper end of the handle 30 extends through a yoke-shaped keeper 31. On the other end of the shaft 28 is an extension 32, having at its extreme end a curved portion 33 projecting into the opening 16. The parts just described are so arranged, that when the handle 30 is moved to one position of its movement within the keeper 31, the curved end member 33 will be free from any contact with the ball valve 17, and will not in any way interfere with the operation of said valve.

On the other hand when the handle 30 is moved to the other limit of its movement, then the curved portion 33 will be projected upwardly into the passage 15, for engaging and lifting the valve 17, and thereby rendering it inoperative.

This is the position of the parts when the device is ready for use, and it is desired to allow the water to flow freely from the tank, controlled only by the water seal provided by the trough 14.

It will be understood that a suitable heating device or devices 34 may be placed in the bottom of the casing 10 for preventing the freezing of water in the tank 12.

My present invention has to do particularly with a construction of a substantially fixed tank and suitable means for filling the tank. When it is desired to fill the tank 12, after it has been emptied by drinking animals, the handle 30 is grasped for lowering the curved member 33, and permitting the ball 17 to drop to its seated position.

The operator then simply grasps the handle 25 and removes the stopper 23 entirely. Water is then poured through the funnel shaped member 19 from a pail or from a pump or with a hose or in any suitable way. The water will fill the tank 12, and the air therein will pass out through the only available opening, by going through the channel 26 and thence through the air exit pipe 27.

One difficulty commonly experienced with stock watering tanks of the general type shown in my drawings, or herein contemplated, is that when they are filled a cushion of air is left in the extreme upper part of the tank. Practically all of these stock watering tanks employ the principle of a water seal for controlling the flow from the tank.

It has been found that where an air cushion is left in the top of the tank after the filling operation, then when the tank is opened at the lower part for allowing the water therein to flow into the trough, the water will not cease flowing when it reaches the level of the discharge opening of the tank, but will continue to flow for a long enough additional period to overflow the trough and cause mud or ice or the like around the trough. This overflow which occurs after filling with the ordinary construction where a small amount of air is left in the top of the tank on filling, is entirely done away by the construction herein shown, in which there is provided the channel 26 in which the air gradually collects after the water rises to the level of the opening 21, and above that level, and by the provision of the pipe 27 leading from the very uppermost part of said channel. With my construction I can drive out all of the air in the tank, and I then find that I do not have the difficulty with the overflow of the ordinary tank.

When my tank has been filled, the operator grasps the handle 25 and replaces the stopper device in position for closing the opening 21.

As long as the water stands above the stopper device, there will obviously be no leakage of air around it. As soon as the water in the tank gets below the level of the stopper, it will be seen that a partial vacuum will be created in the tank, so that the air pressure on the rubber disk member 23 will keep it firmly in its position for closing the opening 21.

The funnel structure and the simple nature of my closure device makes it very easy to fill my tank.

A round tank is easier and cheaper to make than those of other shapes, but it is rather difficult to entirely fill such a tank with water. This difficulty I have overcome with the construction herein shown.

Some changes may be made in the construction and arrangement of my improved stock watering tank, without departing from the essential features and purpose of my invention, and it is my intention to cover by my claim any modified forms of structure or use of mechanical equivalents which may be reasonably included within its scope.

I claim as my invention:

In a device of the class described, a cylindrical tank arranged in substantially horizontal position, a tubular discharge passage leading from the bottom of said tank, a trough below said tank into which said discharge passage projects, a filling funnel device mounted in the upper part of said tank, said tank having in its upper wall a longitudinally arranged, inwardly opening, outwardly projecting channel, and an air exit tube leading from the upper part of said channel and thence downwardly into said trough.

Des Moines, Iowa, February 18, 1920.

CHARLES O. WHITNELL.